US007284459B2

(12) United States Patent
Bellouard

(10) Patent No.: US 7,284,459 B2
(45) Date of Patent: Oct. 23, 2007

(54) REMOTE CENTER OF ROTATION POSITIONING DEVICE

(75) Inventor: Yves Bellouard, Albany, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 718 days.

(21) Appl. No.: 10/728,472

(22) Filed: Dec. 5, 2003

(65) Prior Publication Data

US 2004/0168536 A1     Sep. 2, 2004

Related U.S. Application Data

(60) Provisional application No. 60/431,005, filed on Dec. 5, 2002.

(51) Int. Cl.
*B25J 11/00* (2006.01)
*B25J 17/00* (2006.01)

(52) U.S. Cl. .............................. 74/490.01; 74/490.07; 74/490.1

(58) Field of Classification Search ............. 74/490.01, 74/490.03, 490.05, 490.07, 490.1
See application file for complete search history.

(56) References Cited

U.S. PATENT DOCUMENTS

| | | | |
|---|---|---|---|
| 3,357,268 A | 12/1967 | Richter | |
| 4,088,396 A | 5/1978 | Edelstein | |
| 4,276,697 A | 7/1981 | Drake et al. | |
| 4,337,579 A | 7/1982 | De Fazio | |
| 4,480,918 A | 11/1984 | De Fazio | |
| 4,485,562 A | 12/1984 | De Fazio | |
| 4,537,557 A | 8/1985 | Whitney | |
| 5,419,674 A | 5/1995 | Chang | |
| 5,529,277 A | 6/1996 | Ostaszewski | |
| 5,909,941 A | 6/1999 | Cheng et al. | |
| 6,198,580 B1 | 3/2001 | Dallakian | |
| 6,290,196 B1 * | 9/2001 | Mayenberger | ........... 74/490.06 |

FOREIGN PATENT DOCUMENTS

JP        11-138487        5/1999

OTHER PUBLICATIONS

S.T. Smith, Flexures Elements of Elastic Mechanisms, Gordon and Breach Science Publishers, (2000), pp. 177-179, 192-194, 231-235.
S.T. Smith, D. G. Chetwynd, Foundations of Ultraprecision Mechanism Design, Gordon and Breach Science Publishers, (1992), pp. 95-106, 117-120.

* cited by examiner

*Primary Examiner*—William C. Joyce
(74) *Attorney, Agent, or Firm*—RatnerPrestia

(57) ABSTRACT

A system for positioning an object about a remote center of rotation. A non-movable part provides a stationary reference structure. A movable part moves relative to the non-movable part. A connector coupled between the movable part and the object positions the object adjacent the remote center of rotation and rotates it about the remote center of rotation responsive to movement of the movable part. Movement of the connector responds movement of the movable part. First and second force transmitting components coupled to the movable part move the movable part and the connector in first and second directions, respectively. Movement of the connector in the first direction rotates the object about a first axis passing through the remote center of rotation. Movement of the connector in the second direction rotates the object about a second axis passing through the remote center of rotation.

17 Claims, 10 Drawing Sheets

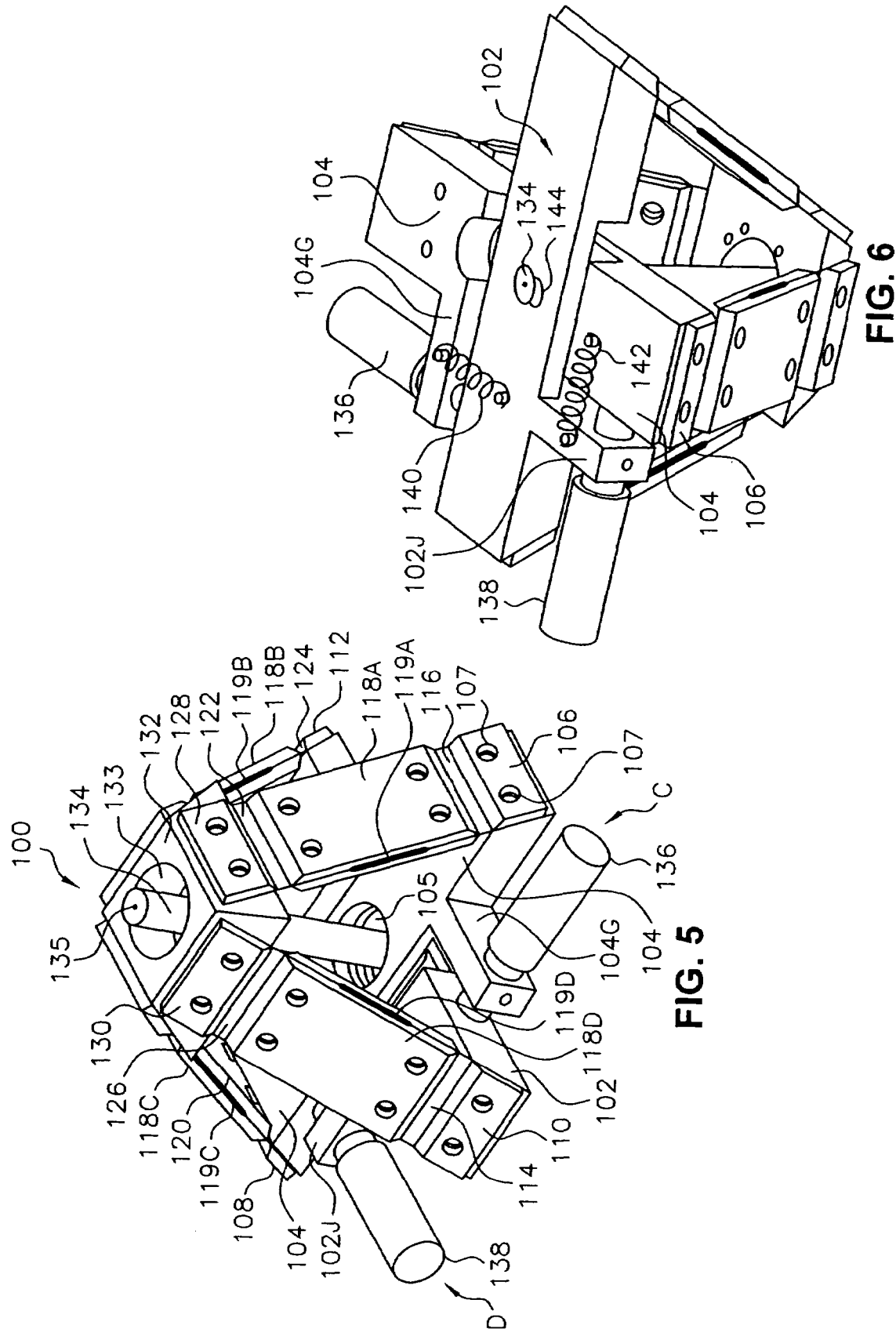

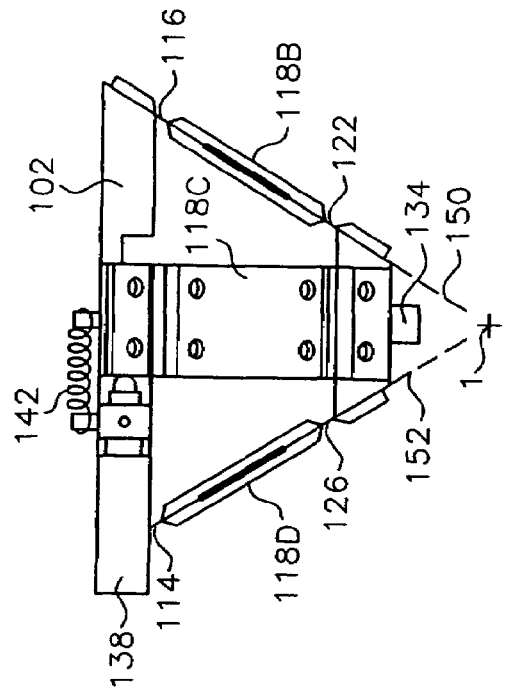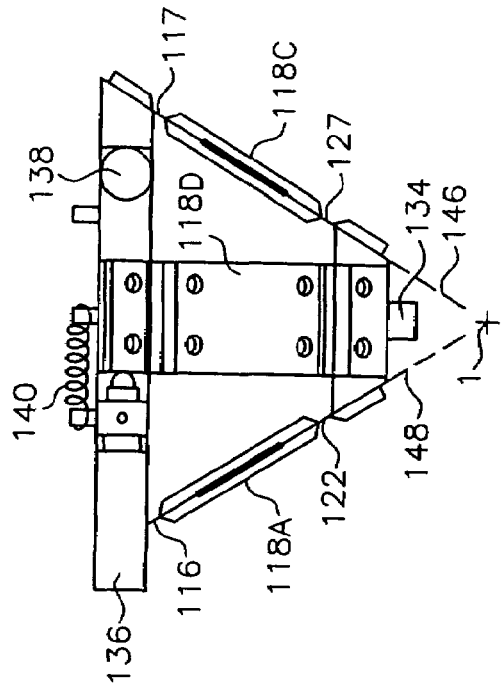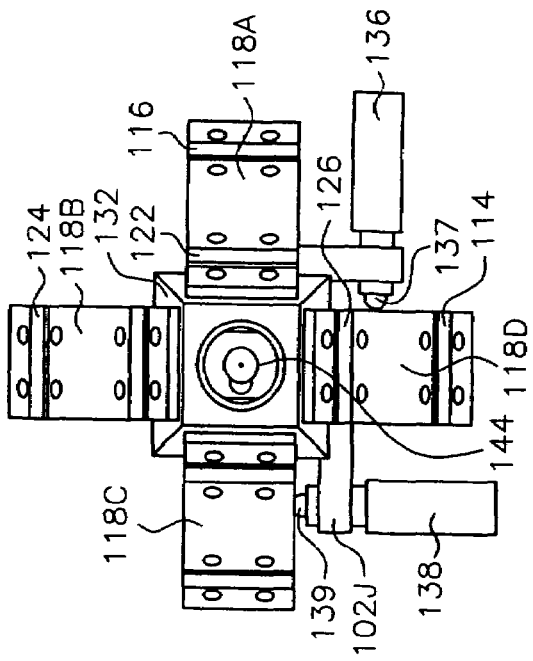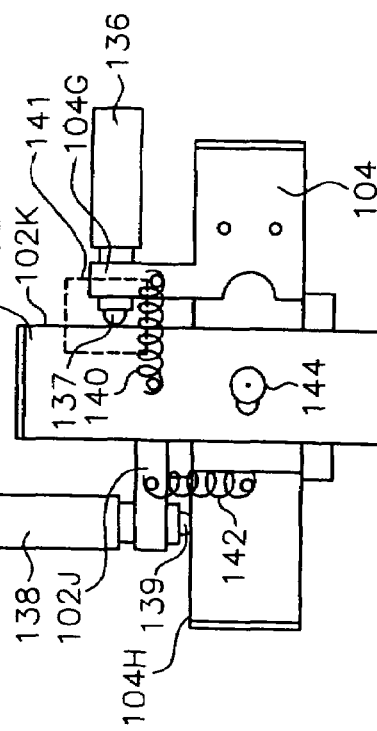
FIG. 7
FIG. 9
FIG. 8
FIG. 10

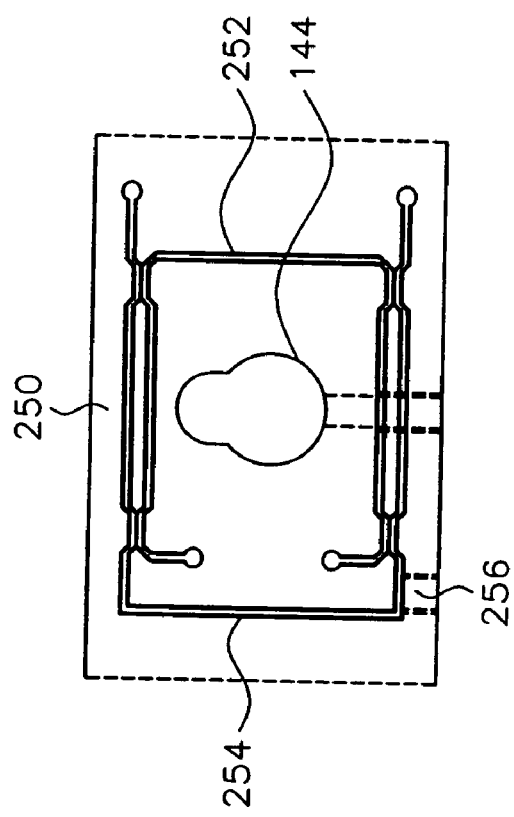
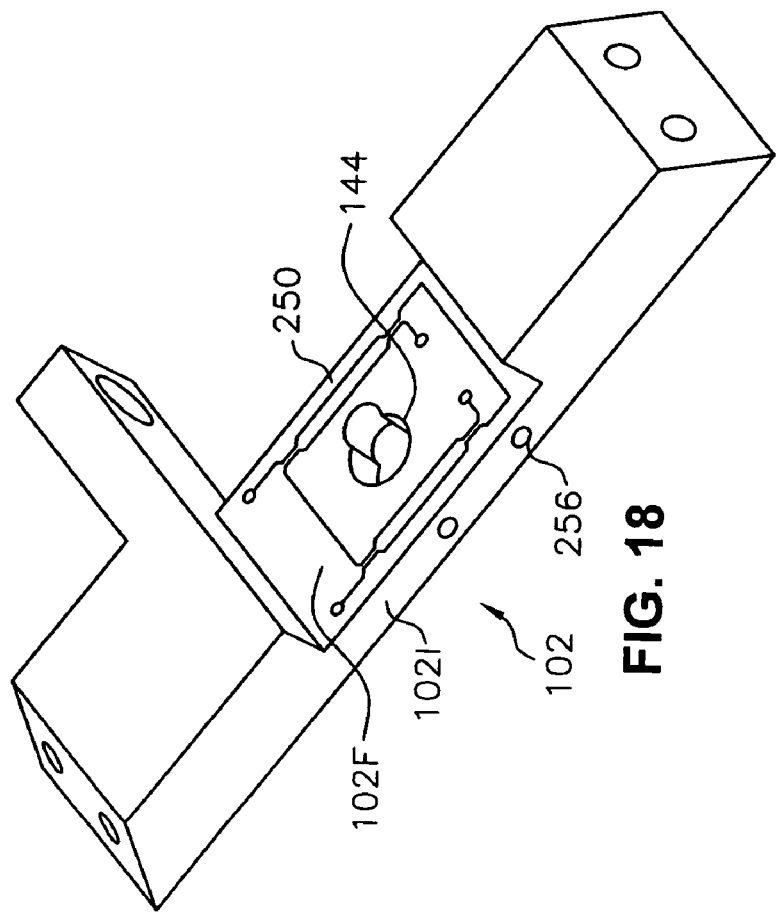

REMOTE CENTER OF ROTATION POSITIONING DEVICE

RELATED APPLICATION

This application claims the benefit of priority to U.S. Provisional Patent Application Ser. No. 60/431,005 filed on Dec. 5, 2002, the contents of which are incorporated in this application by reference.

FIELD OF THE INVENTION

The present invention relates generally to systems for positioning objects and, more particularly, to systems for positioning objects about a remote center of rotation (i.e., a center of rotation that is outside the volume occupied by the positioning system).

BACKGROUND OF THE INVENTION

In precision engineering, flexures are used to replace traditional mechanical joints to provide an accurate, repeatable, wear-free, and friction-free motion. Flexures have been extensively used in engineering applications and can be found in many devices such as compact-disc players, metrology instruments, and positioning devices. Flexures-based mechanisms are very attractive for applications that demand high precision because they provide high linearity with minimal friction and wear.

Compliant structures with a remote center of rotation, also referred to as "RCR" structures, have been extensively used in the automation industry as powerful tools for peg-in-a-hole types of applications. The compliance of the structures is used to self-accommodate part tolerances and alignment errors and to guide the insertion of one part into another part. Passive compliance systems are based on the assumption that there exists a geometrical reference surface that is sufficiently stiff and that can be used to drive an assembly. By definition, passive compliance mechanisms are deformable structures with preferred compliant axes.

There are many cases, however, where passive compliant systems are inefficient. This is particularly true for micro-assembly tasks that not only often lack accurate geometrical references but also require a different approach to contact-based interaction due to the scaling effect on physical interaction forces. RCRs are also inefficient for task-oriented assemblies, such as fiber alignment, in which the alignment quality metric is defined by the quality of the signal transmitted through the interface. Therefore, there is a need for a RCR positioning device that can be actuated. Despite existing RCR kinematics, no actuated RCR flexures have been developed.

In the process of optical system design, the use of optical benches with discrete components that can be quickly reconfigured is essential. In this design scope, a true gimbal mechanism (i.e., a mechanism that provides pan and tilt motions to the desired reference surface) is extremely useful. For example, such a mechanism greatly simplifies the alignment procedure for a laser beam.

One solution combines additional degrees of freedom to virtually recreate a RCR through an adequate command algorithm. For instance, with three degrees of freedom, two translations and a rotation, one can program a rotational motion outside of the mechanical structure. Therefore, with a six-degrees-of-freedom platform, a two-degrees-of-freedom rotational motion can be programmed outside of the mechanical structure. This method offers several advantages, including the ability to easily reconfigure the center of rotation. This method implies, however, the use of a controller combined with an accurate geometrical model of the structure. In addition, by definition, the system needs to be motorized and calibrated. Because the complexity of the system is high (a controller is needed) and because additional degrees of freedom are required (in space, six degrees of freedom), the cost of these systems is usually high. In addition, this system lacks compactness and requires calibration procedures.

U.S. Pat. No. 3,357,268 issued to Richter discloses an optical cell that has a center of rotation defined by a spherical shape machined on one part of the device. The device is made of several parts and uses a similar principle that is described in U.S. Pat. No. 6,198,580 and U.S. Pat. No. 4,088,396.

U.S. Pat. No. 4,088,396 issued to Edelstein discloses an optical mount enabling independent orthogonal adjustment of the angular position of an optical element. It comprises a cell adapted to receive an optical element and a base defining a chamber open on one side to receive at least a part of the cell. This device is similar to the device disclosed in U.S. Pat. No. 6,198,580.

U.S. Pat. No. 4,276,697 issued to Drake et al. discloses a compliance element for a remote center of compliance unit that is formed from a multi-stranded cable having an elastomeric collar molded around a center portion and terminating in threaded connectors for incorporation into the compliance unit. The structure is passive.

U.S. Pat. No. 4,337,579 issued to De Fazio is a deformable remote center of compliance device having a remote center of compliance (RCC) that utilizes flexures. The structure is passive.

U.S. Pat. No. 4,480,918 issued to De Fazio discloses a non-contact displacement sensing system for a RCC device having a movable part and a fixed part. The RCC uses flexures that have five degrees of freedom (bellows-type of flexures). The structure has three loops and, therefore, the mobility is four. This structure has four degrees of freedom: two rotations and two translations. The structure is passive and is parallel.

U.S. Pat. No. 4,485,562 issued to De Fazio discloses a RCC-type of structure using known kinematics. The RCC uses flexures and has a mechanism connected to it that modifies its stiffness depending on the assembly sequences.

U.S. Pat. No. 4,537,557 issued to Whitney discloses the same system described in U.S. Pat. No. 4,485,562 but uses the mechanism attached to the elastic structure to create the function of gripping. The structure is semi-active.

U.S. Pat. No. 5,419,674 issued to Chang discloses a semi-active compliance device that can be used to control the position, force, and orientation of a package during a package stacking operation. The device contains an X-Y motion mechanism for actively controlling the fine positioning and force of a package in two orthogonal directions (X, Y). The design also includes a RCC mechanism for passively controlling the orientation of the package about a third orthogonal direction.

U.S. Pat. No. 5,529,277 issued to Ostaszewski discloses a RCC-type of compliance mechanism that has two degrees of freedom. The structure is serial. Flexure pairs are positioned at right angles to each other and thus comprise perpendicular four-bar linkages.

U.S. Pat. No. 5,909,941 issued to Cheng et al. relates to a passive multiple remote center of compliance. The device is used as a wrist for a robotic arm. This design is made of several parts serially interconnected. It uses a gyrational structure for a remote center part of the structure.

U.S. Pat. No. 6,198,580 issued to Dallakian discloses an optical mount for an optical element which has an optical surface. This device is used for positioning a mirror or optics and has a center of rotation that is on the surface of the optical element. This design uses moving parts that slide into each other and are friction type of joints.

JP 11-138487 issued to Hayakawa Takahiro Natta Ind Corp. discloses an elastic structure that uses bellows arranged such that they define a RCR outside of the mechanical structure. The principle seems to be similar to the one described in U.S. Pat. No. 4,480,918.

A goniometer is based on a ball-screw mechanism. The tap is made such that the moving platform describes a circular motion relative to a remote center. Axes can be stacked to combine two degrees of freedom. This type of mechanism effectively creates a RCR. It is sensitive, however, to backlash and friction and is not easily reconfigurable. A gimbal mechanism like the one in U.S. Pat. No. 6,198,580 issued to Dallakian is based on a universal joint actuated from the side. This mechanism is also not free of friction and is very sensitive to specific dimensions such as a given thickness and size of mirror.

These technologies use bearing-type or friction-based mechanical joints. High resolution, accuracy, and repeatability can hardly be obtained with competing technologies that use bearing-type or friction-based mechanical joints. It is necessary to use flexures to obtain these performance attributes.

FIG. 1 illustrates the actuation principle of a conventional one-axis four-bar link 10. The conventional four-bar mechanism comprises four connected bars 12, 14, 16, and 18 linked to form a trapezoid. Bar 18 is the fixed part of four-bar link 10, and is fixed to the ground or reference surface 20. Bars 12, 14, and 16 pivot at each of their ends about a rotational axis orthogonal to the plane defined by any two adjacent bars. Thus, bar 14 pivots about point A, bars 12 and 14 pivot about point B, bars 12 and 16 pivot about point C, and bar 16 pivots about point D. Before any of the bars are rotated, an angle is set between bars 14, 18 and between bars 16, 18.

A line 15 may be extended from bar 14 beyond bar 12. A line 17 may be extended from bar 16 beyond bar 12. Lines 15 and 17 from bars 14 and 16, respectively, may be extended beyond bar 12 until they intersect. The point where lines 15 and 17 from bars 14 and 16 intersect defines a remote center of rotation (RCR) 1. The position of the remote center of rotation can be fully determined based on the geometrical parameters of the four-bar link 10.

In view of the discussion of conventional devices provided above, a need remains for a remote center of rotation positioning device that can be actuated. It is an object, therefore, to design such an active structure. A related object is to design a RCR structure accurate enough to define a remote center of rotation outside the mechanism in a given accuracy window. Another object is to provide a structure offering minimal wear and friction capable of repeatable motion and reconfiguration. Still another object is to use flexures and avoid bearing-type or friction-based mechanical joints. A further object is to provide a structure that can hold optical devices such as optical fibers, mirrors, and crystals. A still further object is to mount the output of the mechanism such that the free volume around the structure is maximized.

SUMMARY OF THE INVENTION

To achieve these and other objects, and in view of its purposes, the present invention provides a system for positioning an object by rotating the object about a remote center of rotation. The system comprises a non-movable part for providing a stationary reference structure and a movable part positioned for movement relative to the non-movable part. A connector is coupled between the movable part and the object for positioning the object adjacent the remote center of rotation and for rotating the object about the remote center of rotation responsive to movement of the movable part.

A movement of the connector is responsive to a movement of the movable part. A first force transmitting element coupled to the movable part moves the movable part and the connector in a first direction. Movement of the connector in the first direction rotates the object about a first axis passing through the remote center of rotation. A second force transmitting element coupled to the movable part moves the movable part and the connector in a second direction. Movement of the connector in the second direction rotates the object about a second axis passing through the remote center of rotation.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 5 is a top perspective view of an exemplary embodiment of the invention;

FIG. 6 is a bottom perspective view of an exemplary embodiment of the invention;

FIG. 7 is a top view of the exemplary embodiment of the invention illustrated in FIG. 5;

FIG. 8 is a side view of the exemplary embodiment of the invention illustrated in FIG. 7;

FIG. 9 is a bottom view of the exemplary embodiment of the invention illustrated in FIG. 6;

FIG. 10 is a side view of the exemplary embodiment of the invention illustrated in FIG. 9;

FIG. 18 is a top perspective view of a second embodiment of the movable base plate of the invention;

FIG. 19 is an expanded top view of the second embodiment of the movable base plate of the invention shown in FIG. 18.

DETAILED DESCRIPTION OF THE INVENTION

For a high-precision mechanism, flexures are very helpful to provide a mechanism having minimal wear and friction while offering repeatable motion. Accordingly, the present invention incorporates flexures. The invention avoids bearing-type or friction-based mechanical joints.

Figure 2:
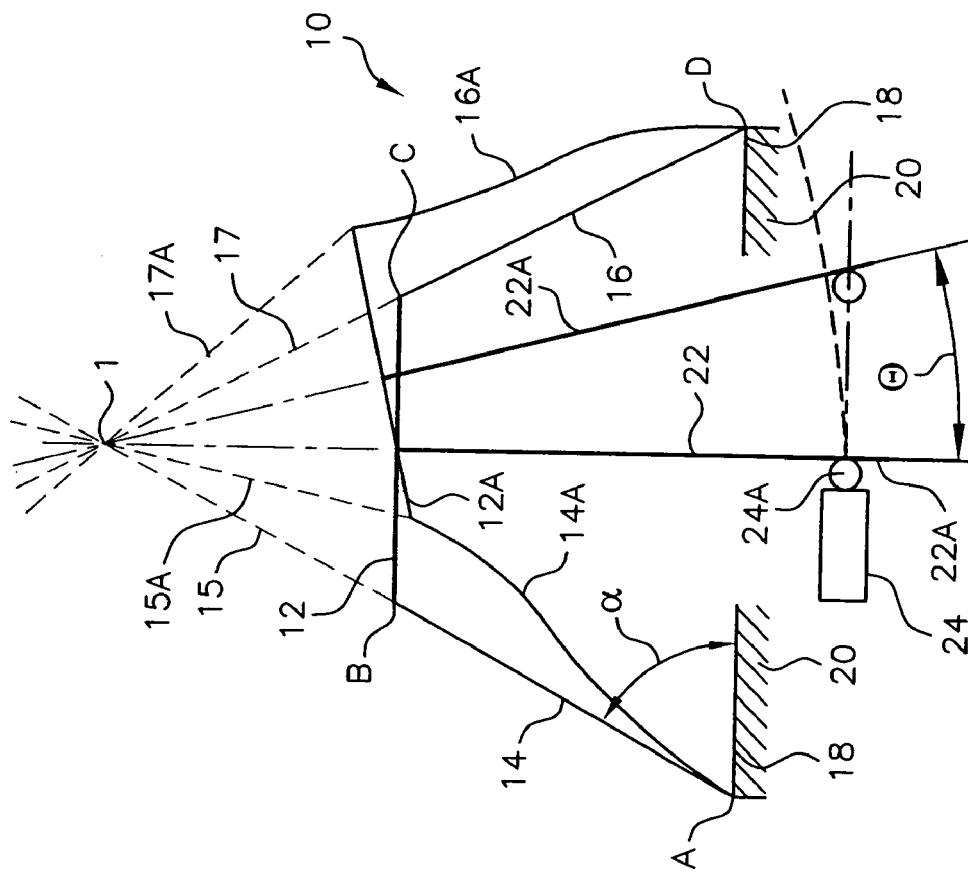
FIG. 2 is an illustration of the actuation principle of a one-axis four-bar link according to an exemplary embodiment of the invention.
Figure 1:
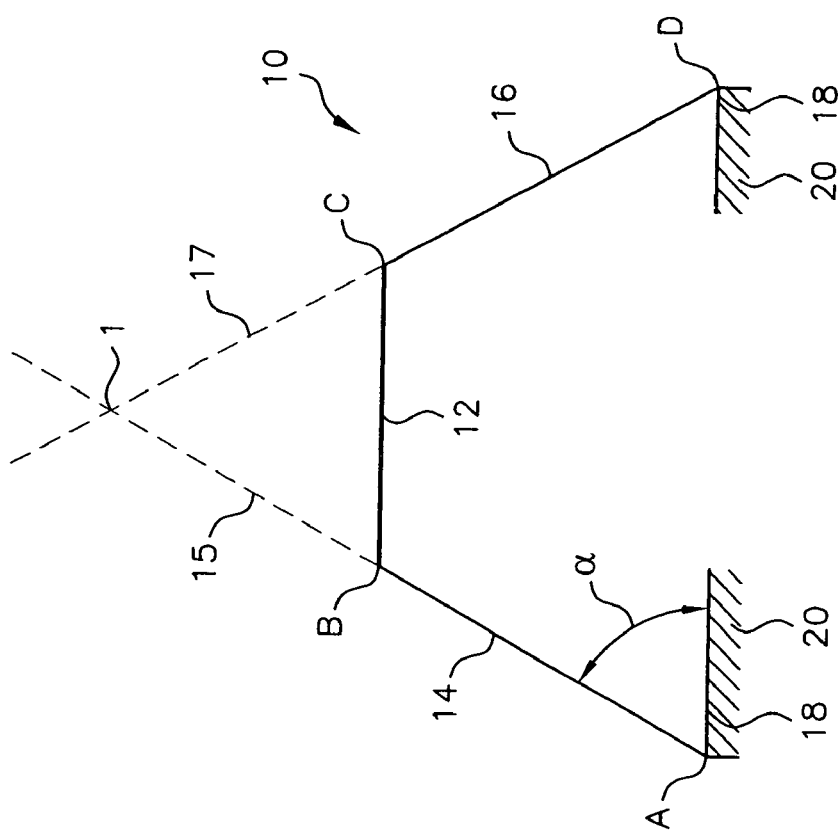
FIG. 1 is an illustration of the actuation principle of a conventional one-axis four-bar link.

Referring now to the drawing, in which like reference numbers refer to like elements throughout the various figures that comprise the drawing, FIG. 2 illustrates the actuation principle of a one-axis four-bar link according to an exemplary embodiment of the invention. In FIG. 2, a bar 22 is coupled to bar 12. In this embodiment, bars 14 and 16 may be flexures which connect mobile bar 12 to fixed bar 18.

The angular motion of the T-shape formed by bars 12 and 22 is controlled by the motion of a micropositioner actuator 24 that has a sphere 24A such that a single contact point is defined between the micropositioner actuator 24 and the bar 22. Such a contact has three degrees of freedom. When the micropositioner actuator 24 moves horizontally, sphere 24A applies force to bar 22 at the point 22A, flexures or bars 14 and 16 bend to new positions 14A and 16A, and bar 12 rotates about remote center of rotation 1 to new position 12A. In addition, bar 22 rotates about the remote center of rotation 1 by angle θ to new position 22A. The relationship between the horizontal motion of the micropositioner actuator 24 and the angular rotation at the moving platform is non-linear and defines one degree of freedom. Extension lines 15 and 17 from bars 14 and 16 move to form new extension lines 15A and 17A from bars 14A and 16A.

Figure 4:
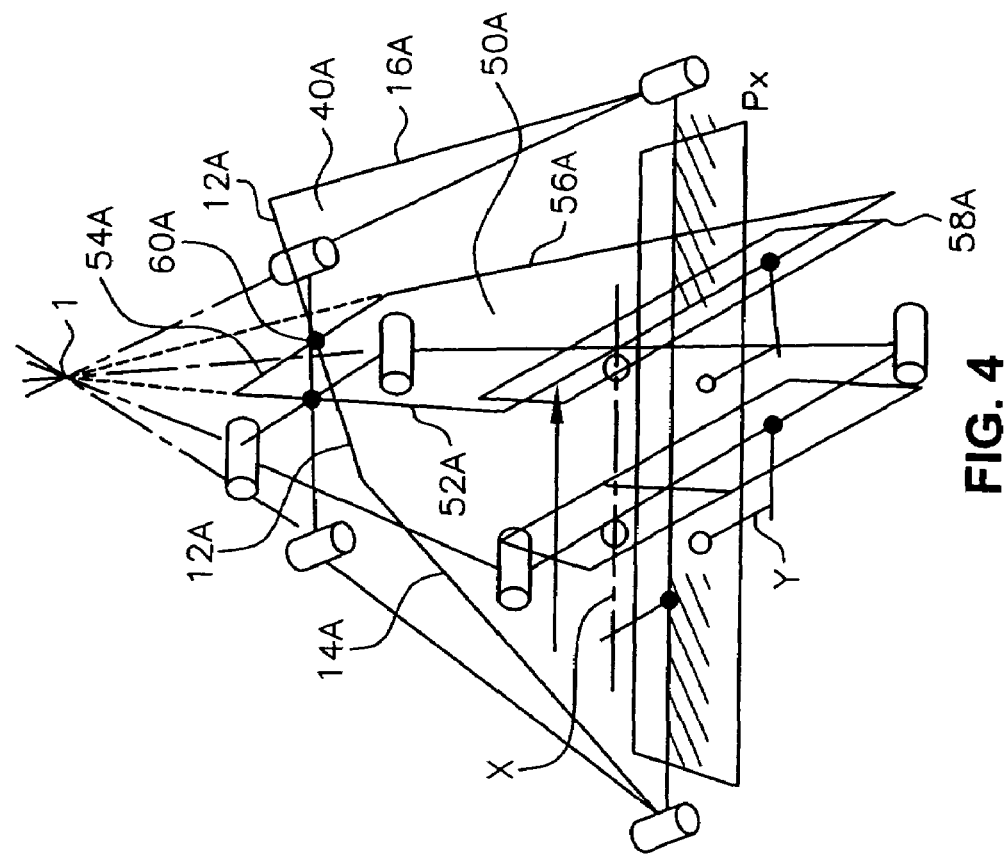
FIG. 4 is an illustration of motion along the X axis using the actuation principle illustrated in FIG. 3.
Figure 3:
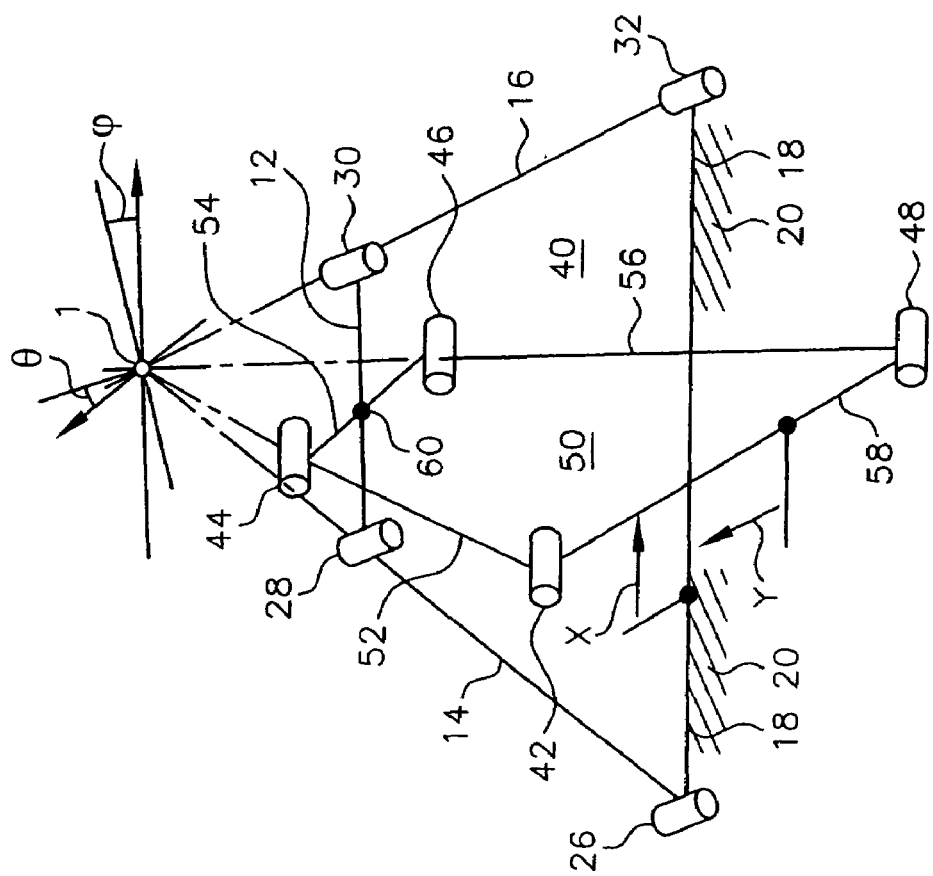
FIG. 3 is an illustration of the actuation principle of a two-axis mechanism having two four-bar links.

The concept shown in FIG. 2 may be extended to a second degree of freedom shown in FIGS. 3 and 4. FIG. 3 illustrates the actuation principle of a two-axis mechanism having two four-bar links. FIG. 4 illustrates motion along the X axis using the actuation principle illustrated in FIG. 3. The actuation principle illustrated in FIGS. 3 and 4 is an extension of the concept of the trapezoidal four-bar link mechanism to a second degree of freedom.

Referring to FIG. 3, two orthogonal, trapezoidal-shaped planes 40 and 50 are shown. Bars 12, 14, 16, and 18 form trapezoidal plane 40. Bars 52, 54, 56, and 58 form trapezoidal plane 50. Planes 40 and 50 are orthogonal to each other. Bar 14 is coupled to rotary joints 26 and 28; bar 12 is coupled to rotary joints 28 and 30; bar 16 is coupled to rotary joints 30 and 32; and bar 18 is coupled to rotary joints 32 and 26. Bar 52 is coupled to rotary joints 42 and 44; bar 54 is coupled to rotary joints 44 and 46; bar 56 is coupled to rotary joints 46 and 48; and bar 58 is coupled to rotary joints 48 and 42. Non-movable bar 18 couples plane 40 to reference 20. Extensions of bars 14 and 16 intersect at remote center of rotation 1. Extensions of bars 52 and 56 also intersect at remote center of rotation 1. Bars 14, 16, 52, and 56 may be flexures. Bars 54 and 12 are coupled at point 60 such that they form a rigid structure.

Planes 40 and 50 are connected to each other at point 60, a point that is located on bar 12 of plane 40 and on bar 54 of plane 50. Elements forming plane 50 may be moved in the Y direction relative to plane 40 by a first force transmitting element (not shown) that is coupled to movable bar 58. Elements forming plane 50 may also be moved in the X direction relative to plane 40 by a second force transmitting element (not shown) that is mounted on non-movable bar 18 and coupled to movable bar 58. An output of the mechanism illustrated in FIG. 3 is coupled to movable bar 58.

When elements forming plane 50 move in the Y direction relative to plane 40, a point on movable bar 58 will rotate through an angle φ relative to the remote center of rotation 1. That is, a point of movable bar 58 will rotate by the angle φ about a first axis passing through the remote center of rotation 1. When plane 50 moves in the X direction relative to plane 40, a point on movable bar 58 will rotate by an angle θ relative to the remote center of rotation 1. That is, a point on movable bar 58 will rotate by the angle θ about a second axis passing through the remote center of rotation 1.

Referring to FIG. 4, there is shown an illustration of motion along the X axis using the actuation principle illustrated in FIG. 3. In FIG. 4, a force has been applied to plane 50 causing it to move to the right along the X axis. As a result, elements forming planes 40 and 50 have moved along the X axis and formed planes 40A and 50A, respectively. In plane 40A, flexure bar 12 has moved to position 12A; flexure bar 14 has moved to position 14A; and flexure bar 16 has moved to position 16A. In plane 50A, bars 52, 54, 56, and 58 have moved to positions 52A, 54A, 56A, and 58A, respectively. Common connection point 60 has moved to position 60A. Consequently, a line drawn from a point on movable bar 58 through common connection point 60A to the remote center of rotation 1 shows that the point has been rotated about the remote center of rotation 1.

Referring to FIGS. 5 and 6, there is shown a top perspective view and a bottom perspective view, respectively, of an exemplary embodiment of the positioning system 100 of the invention. In an exemplary embodiment, all of the components of the device may be made of metal. In an alternative embodiment, all of the components may be made of plastic. In yet another alternative embodiment, some of the components may be made of metal while others are made of plastic.

Figure 13:
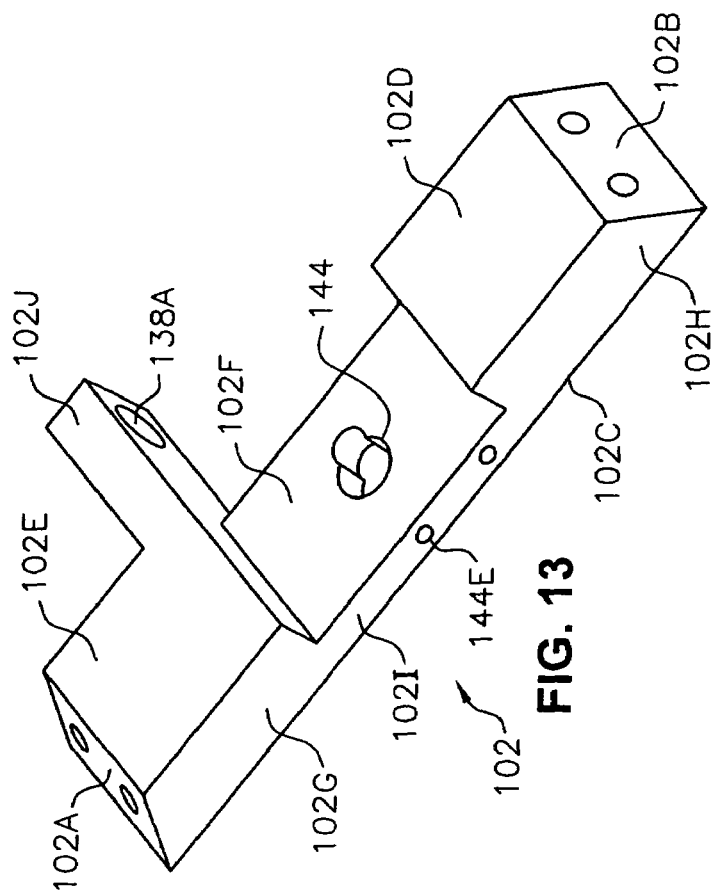
FIG. 13 is a top perspective view of a movable part illustrated in FIG. 5.
Figure 15:
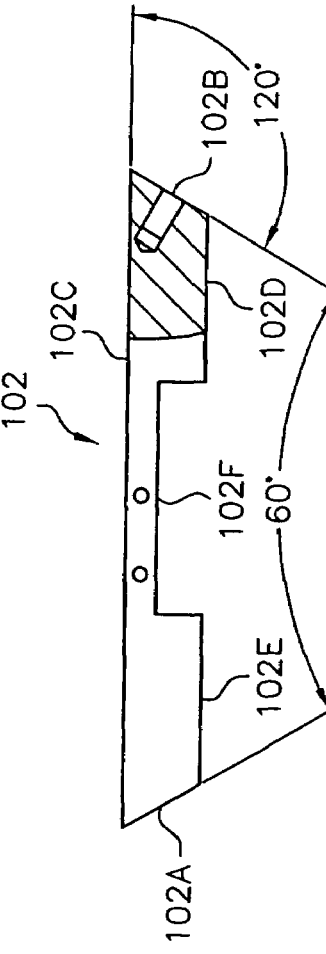
FIG. 15 is a side view of the movable part illustrated in FIG. 13.

A base plate 102 is at the bottom of the device. Base plate 102 is a movable part of the device and provides an output motion from the device. FIG. 13 is a top perspective view of the movable base plate 102 illustrated in FIG. 5. FIG. 15 is a side view of movable base plate 102.

Turning to FIG. 13, movable base plate 102 has angled side walls 102A, 102B and a bottom surface 102C connecting the side walls. Adjacent side wall 102A is a trapezoidal-shaped segment 102E having a front surface 102G. A rectangular-shaped extension 102J of segment 102E extends perpendicularly away from front surface 102G. Extension 102J has an opening 138A which is adapted to receive a force transmitting element as will be explained below. Adjacent side wall 102B is a trapezoidal-shaped segment 102D having a front surface 102H. As shown in FIG. 15, in an exemplary embodiment of the invention, side walls 102A and 102B form a 120° angle with bottom surface 102C and a 60° angle between themselves. In an alternative embodiment, side walls 102A and 102B may form differently sized angles.

A rectangular-shaped segment 102F is located between segment 102D and segment 102E. Rectangular segment 102F has a front surface 102I. The thickness of rectangular segment 102F, as shown by the thickness of front surface 102I, is less than the thickness of segments 102D and 102E. Therefore, segment 102F forms a slot between segments 102D and 102E. An opening 144 (also shown in FIG. 6) is formed in segment 102F. Opening 144 transverses the entire thickness of segment 102F in a direction that is normal to the top surface of segment 102F. Opening 144 is adapted to receive a connector as will be explained below. A hole 144E is formed in front surface 102I. Hole 144E transverses segment 102F in a direction that is normal to front surface 102I. Hole 144E continues across segment 102F until it intersects opening 144.

Figure 11:
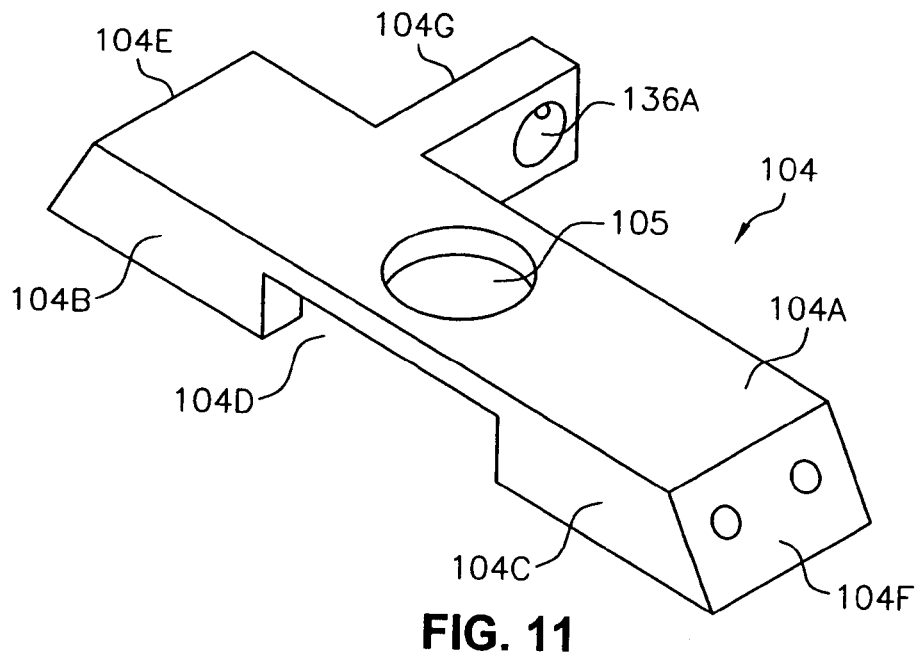
FIG. 11 is a top perspective view of a non-movable part illustrated in FIG. 5.
Figure 12:
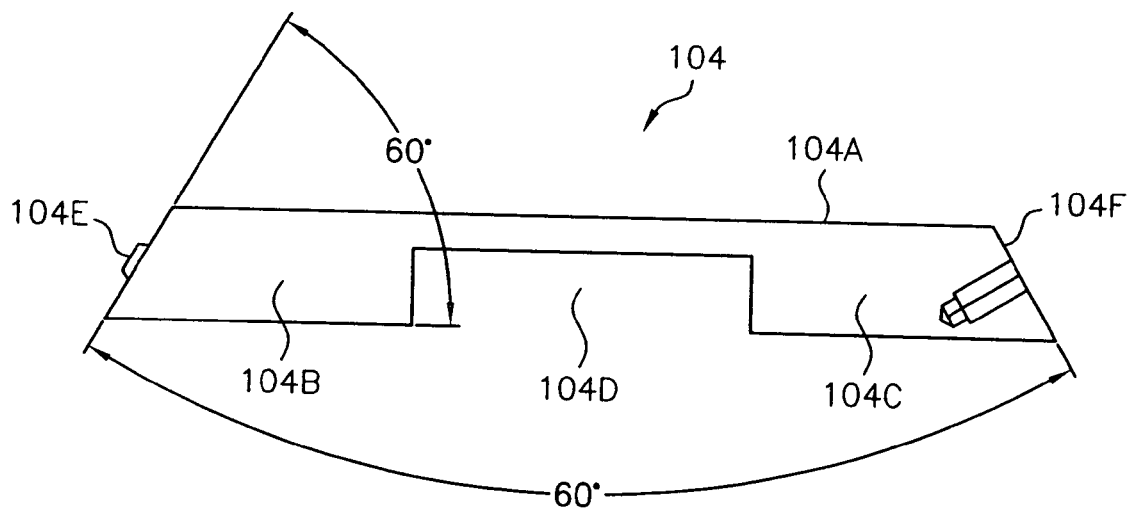
FIG. 12 is a side view of the non-movable part illustrated in FIG. 11.

Returning to FIGS. 5 and 6, an intermediate plate 104 is placed on top of base plate 102. Intermediate plate 104 is coupled to a reference surface (not shown) and is a non-movable part of the device. In an exemplary embodiment, the reference surface may be the ground. In an alternative embodiment, the reference surface may be any surface upon which the device is mounted. Intermediate plate 104 is also shown in FIGS. 11 and 12. FIG. 11 is a top perspective view of intermediate plate 104 and FIG. 12 is a side view.

As shown in FIGS. 11 and 12, intermediate plate 104 has a top surface 104A and two trapezoidal-shaped end segments 104B, 104C that are separated by a segment 104D. The thickness of segment 104D is less than the thickness of segments 104B and 104C. As a result, segment 104D forms a slot between end segments 104B and 104C. As shown in FIGS. 5 and 6, the slot formed by segment 104D in intermediate plate 104 fits into the slot formed by segment 102F of base plate 102. The complementary mating and overlapping of these two slots allows movable base plate 102 to move relative to non-movable intermediate plate 104.

Top surface 104A has an opening 105 (also shown in FIG. 5) for receiving a connector as will be explained below. When the slots formed by segments 102F and 104D are coupled, a central axis of opening 105 is aligned with a central axis of opening 144. In an exemplary embodiment, the diameter of opening 105 is larger than the diameter of opening 144. In an alternative embodiment, the diameters of the two openings may be sized differently.

Returning to FIGS. 11 and 12, segment 104B forms an end 104E and segment 104C forms an end 104F. In an exemplary embodiment, ends 104E and 104F form a 60° angle with the bottom surfaces of segments 104B and 104C, respectively, and form another 60° angle between themselves. In an alternative embodiment, these angles may be different sizes. A rectangular-shaped extension 104G (also shown in FIGS. 5 and 6) extends from, and perpendicularly to, segment 104B. An opening 136A extends all the way through extension 104G and is adapted to receive a force transmitting element as will be explained below.

FIG. 7 is a top view of the device. Referring to FIGS. 7 and 5, a square-shaped upper connection plate 132 is spaced from base plate 102 and intermediate plate 104. An opening 133 is located in the center of upper connection plate 132. The central axis of opening 133 is aligned with the central axes of openings 144 and 105. In an exemplary embodiment, the diameter of opening 133 is larger than the diameters of openings 144 and 105. In an alternative embodiment, the diameter of opening 133 may be sized differently relative to the diameters of openings 144 and 105.

A series of four flexures 119A, 119B, 119C, and 119D are coupled between the bottom of the device and upper connection plate 132. Each of the flexures are sandwiched between two plates. In an exemplary embodiment of the invention, the material used to manufacture the flexures is Cu—Be. In an alternative embodiment, the material may be a spring-steel or any material that exhibits a super-elastic effect. Some shape memory alloys exhibit the super-elastic effect. Examples of such shape memory alloys are Ni—Ti, Ni—Ti—X (where X can be Cu, Hf, Zr, Pd, Co, or Fe), Cu—Zn—Al, and Cu—Al—Be. In yet another alternative embodiment, the flexures may be made from a plastic material. Also in an exemplary embodiment, each of the flexures may be a single strip.

One end of each flexure 119A, 119B, 119C, and 119D is clamped at the bottom and one end of each flexure 119A, 119B, 119C, and 119D is clamped at the top to upper connection plate 132. For example, flexure 119C is sandwiched between front plate 118C and back plate 120. Other front plates are 118A, 118B, and 118D. These front plates, along with their respective back plates, sandwich flexures 119A, 119B, and 119D, respectively. The front and back plates may be referred to as reinforcing plates.

In an alternative embodiment, flexures 119A, 119B, 119C, and 119D may be used without reinforcing plates. In another alternative embodiment, two cross pivot strips may be used in place of one strip. In yet another alternative embodiment, each cross pivot strip may be replaced by a notch hinge. In fact, any flexures defining a rotational joint may be used. Such alternative flexures are described by S. T. Smith in *Flexures: Elements of Elastic Mechanisms* (Gordon & Breach Science Publisher 2000), and by S. T. Smith and D. G. Chetwynd in "Foundations of Ultraprecision Mechanism Design," *Developments in Nanotechnology*, Vol. 2 (Gordon & Breach Science Publisher 1992).

Flexure 119A is clamped to non-movable intermediate plate 104 by clamp 106. Flexure 119B is clamped to movable base plate 102 by clamp 112. Flexure 119C is clamped to non-movable intermediate plate 104 by clamp 108. Flexure 119D is clamped to movable base plate 102 by clamp 110. In an exemplary embodiment, each of the clamps are attached with screws (not shown) inserted into holes 107. In an alternative embodiment, the clamps may be attached by any other fastening mechanisms or joining techniques including bolts, glue, or welding.

The top of flexure 119A is clamped to upper connection 132 by clamp 128. The top of flexure 119D is clamped to upper connection 132 by clamp 130. The tops of flexures 119B and 119C are similarly clamped to upper connection 132. The clamps and the sandwich plates do not fully encase any of the flexures in their entirety. For example, two sections, 116 and 122, of flexure 119A are not encased and two sections, 117 and 127, of flexure 119C are not encased. Also, section 124 of flexure 119B and sections 114 and 126 of flexure 119D are not encased. Similarly, each of the other flexures have similar sections which are not encased.

Each section of the flexures that is not encased may bend by rotating about its rotational axis, which is in the plane defined by the surface of the flexure but orthogonal to the longitudinal axis of the flexure. The flexures may bend in this direction because the section that is not encased has a first stiffness that is a relatively low stiffness. The flexures may not bend or rotate about any other of their axes because the sections that are encased have a second stiffness that is a relatively high stiffness. The second stiffness is greater than the first stiffness.

Referring to FIGS. 8 and 10, it is seen that the device is oriented with respect to remote center of rotation 1. Remote center of rotation 1 is a point that is outside the volume of device 100. Each of the flexures has a longitudinal axis. Referring to FIG. 10, reference number 146 identifies the extension of the longitudinal axis of flexure 118C and reference number 148 identifies the extension of the longitudinal axis of flexure 118A. Referring to FIG. 8, reference number 150 identifies the extension of the longitudinal axis of flexure 118B and reference number 152 identifies the extension of the longitudinal axis of flexure 118D. The longitudinal axes of all of the flexures, and the extensions of the longitudinal axes of all of the flexures, are designed so that they all pass through the remote center of rotation 1.

Returning to FIG. 5, a cylindrical-shaped connector 134 is positioned partially within the volume of device 100 and extends through opening 133 in upper connection 132 beyond the volume of device 100. A hole 135 is located substantially in the center of connector 134 and extends the entire longitudinal length of connector 134. The purpose of hole 135 is to receive a fiber (not shown). Connector 134 may extend to a point that is adjacent the remote center of rotation 1. One end of the fiber may also extend to a point that is adjacent the remote center of rotation 1. The other end of the fiber may be coupled to a source of light. Connector 134 extends downward through opening 105 in non-movable intermediate plate 104. After connector 134 passes through opening 105, it continues to opening 144 in base plate 102 as shown in FIGS. 6 and 7.

Figure 14:
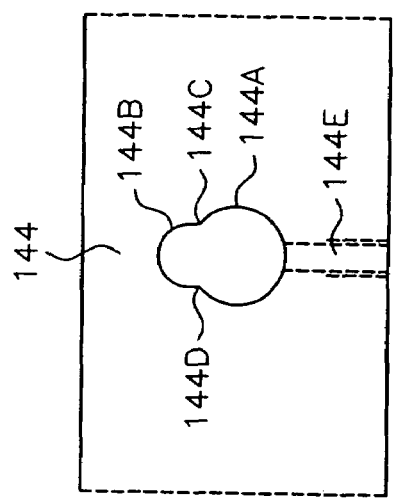
FIG. 14 is a top view of a segment of the movable part illustrated in FIG. 13.

Referring to FIG. 14, it is seen that opening 144 comprises two arcs 144A and 144B having different radii. The radius of arc 144A is greater than the radius of arc 144B. Two contact points 144C and 144D are formed where arc 144A meets arc 144B. A hole 144E in side surface 102I of base plate 102B (shown in FIGS. 13 and 14) receives a screw (not shown). When connector 134 is inserted into arc 144A of opening 144, a screw is inserted into hole 144E and turned until it impinges upon the outside of connector 134 and forces connector 134 against contact points 144C and 144D. The use of two contact points ensures that connector 134 is always inserted with the same position into opening 144 regardless of tolerances due to fabrication issues.

Referring to FIGS. 5-10, it is seen that an exemplary embodiment of the device 100 has two force transmitting elements 136 and 138. Each of the force transmitting elements 136 and 138 may be an actuator that can expand or shrink in one direction. For example, the actuators may be a linear motor, a piezoelectric motor, an inchworm, a shape memory actuator, or a simple manual micro-positioner. Actuator 136 is a first force transmitting element and actuator 138 is a second force transmitting element. As shown, for example, in FIGS. 5, 7, and 11, actuator 136 is mounted to non-movable intermediate part 104 by coupling it to opening 136A in extension 104G.

As shown, for example, in FIGS. 7 and 9, a sphere 137 is affixed to an end of actuator 136. Before actuator 136 is activated, sphere 137 contacts a side surface of movable base plate 102. The sphere 137 may be part of the actuator 136 itself. For instance, actuator 136 may have a spherical shape at the tip. Sphere 137 presses against surface 102K of movable base plate 102. In an exemplary embodiment, surface 102K may be coated with a hard material such as silicon carbide (SiC) to increase its hardness. In another embodiment, a plate made of hard material such as sapphire may be affixed to surface 102K.

Referring to FIG. 13, surfaces 102G, 102I, and 102H define a plane that is parallel to the surfaces and extends upward from bottom surface 102C past segments 102E, 102J, and 102D. When actuator 136 is activated so that, for example, it expands, sphere 137 pushes against movable base plate 102 in the direction of arrow C (shown in FIG. 5) and, therefore, pushes against the plane defined by surfaces 102G, 102I, and 102H and transmits a first force against the is plane. Segments 116 and 122 of flexure 119A and the un-encased segments of flexure 119C are the only segments that bend in response to pressure from sphere 137. The un-encased segments of flexures 119B and 119D do not bend because their stiffness in the direction of arrow C prevents them from bending. Flexures 119A and 119C, along with actuator 136, comprise the first force transmitting means.

As force is applied by actuator 136 to the plane formed by movable base plate 102, the plane moves in a translational direction that is orthogonal the longitudinal axis of non-movable intermediate plate 104. Because connector 134 is firmly clamped inside opening 144 as shown in FIGS. 7 and 13, connector 134 moves along with the plane. The effect of this movement has been explained in connection with FIGS. 3 and 4 and will be further explained in more detail below.

As shown, for example, in FIGS. 5, 7 and 13, actuator 138 is mounted to movable base plate 102 by coupling it to opening 138A in extension 102J. As shown, for example, in FIGS. 7 and 9, a sphere 139 is affixed to an end of actuator 138. Before actuator 138 is activated, sphere 139 contacts a side surface of non-movable intermediate plate 104. When actuator 138 is activated so that, for example, it expands, sphere 139 pushes against non-movable intermediate plate 104. Sphere 139 presses against surface 104H of non-movable intermediate plate 104. In an exemplary embodiment, surface 104H may be coated with a hard material such as silicon carbide to increase the hardness of surface 104H. In another embodiment, a plate made of hard material such as sapphire may be affixed to surface 104H.

Because intermediate plate 104 does not move, activation of actuator 138 does not move it. Because actuator 138 is coupled to extension 102J, however, expansion of actuator 138 pushes against movable base plate 102 in the direction indicated by arrow D of FIG. 5. Force in the direction of arrow D causes movable base plate 102 to rotate. The rotation of movable base plate 102 also causes the plane formed by base plate 102 to rotate. This rotation is permitted by the un-encased segments of flexures 119D and 119B. The un-encased segments of flexures 119A and 119C do not bend because their stiffness in the direction of arrow D prevents them from bending. Flexures 119B and 119D, along with actuator 138, comprise the second force transmitting means.

As force is applied by actuator 138 to the plane formed by movable base plate 102, the plane moves in a rotational direction. Because connector 134 is firmly clamped inside opening 144 as shown in FIGS. 7 and 13, connector 134 moves along with the plane. The effect of this movement will be explained in more detail below.

Before force is applied either by actuator 136 or by actuator 138, an extension of the longitudinal axis of connector 134 extends through the remote center of rotation 1 as shown in FIGS. 8 and 10. Application of force by either actuator causes connector 134 to rotate about the remote center of rotation.

The combination of each actuator with its paired flexures decouples the motion caused by one actuator from the motion caused by the other actuator. That is, translational motion caused by actuator 136 does not cause rotational motion. Similarly, rotational motion caused by actuator 138 does not cause translational motion.

Referring, for example, to FIGS. 6 and 7, springs 140 and 142 are coupled to various points on non-movable intermediate plate 104 and movable base plate 102. Spring 140 is coupled from a point on movable base plate 102 to a point on extension 104G that is adjacent to actuator 136. Spring 142 is coupled from a point on non-movable intermediate plate 104 to a point on extension 102J that is adjacent to actuator 138.

The sphere 137 of actuator 136 is not fixed to movable base plate 102 at the contact point shown, for example, in FIG. 9. Similarly, the sphere 139 is not fixed to non-movable intermediate plate 104 at the contact point shown, for example, in FIG. 9. Instead, the contact points are sliding points. Thus, sphere 137 may slide along the surface of movable base plate 102 in the area denoted by dotted box 141. Similarly, sphere 139 may slide along the surface of non-movable intermediate plate 104. Springs 140 and 142 hold each of the spheres 137 and 139 against their respective contact points as the actuators 136 and 138 expand and contract. The springs 140 and 142 are particularly important when the actuators 136 and 138 contract. Without the springs 140 and 142, the actuators 136 and 138 could only push; they could not pull. The springs 140 and 142 allow the actuators 136 and 138 to pull.

In operation, the invention can be used to orient a variety of objects about a remote center of rotation. For example, and without intending to limit the uses to which the invention can be put, the invention can be used to orient an optical fiber, a mirror, a crystal, and a needle. Whatever the object may be, the object to be oriented can be attached to the end of connector 134 of the invention. After the object is attached, the length of connector 134 may be adjusted and the angular position may be adjusted so that a desired section of the object is at the remote center of rotation.

Afterward, the object's section of interest at the remote center of rotation may be considered to be in a plane and the invention may be used to change and fix the orientation of the plane about the remote center of rotation. The orientation may be changed responsive to application of one or both of the forces from actuators 136 and 138 which cause the flexures to be deflected into a fixed configuration. If it is desired to change the orientation again, the orientation may be changed again in response to a new application of one or both of the forces from actuators 136 and 138. These new forces will cause the flexures to be deflected into a new fixed configuration. Each time the configuration of the flexures is changed, the orientation of connector 134 about the remote center of rotation and, therefore, the orientation of the object coupled to connector 134 about the remote center of rotation is modified.

Figure 16:
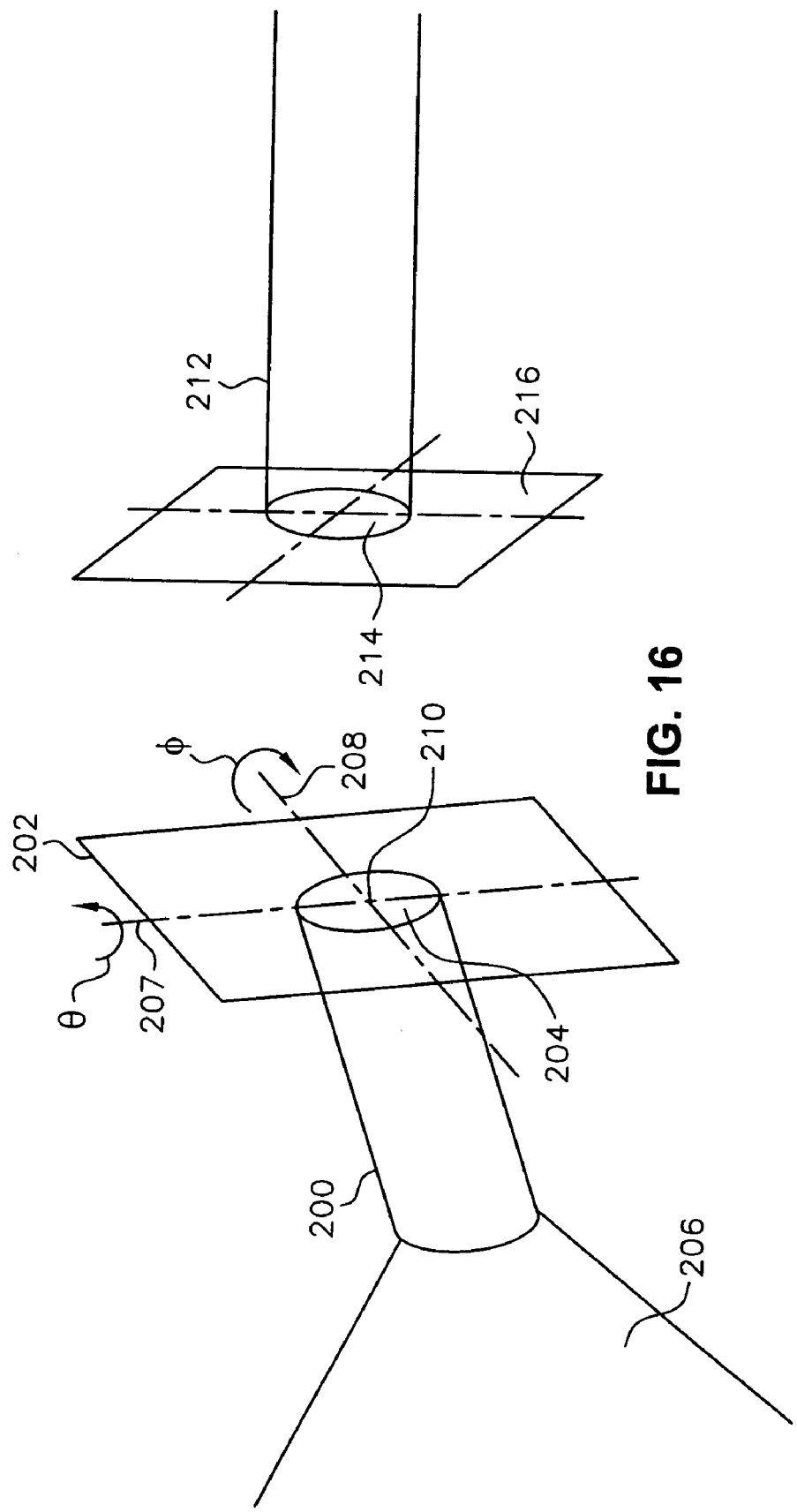
FIG. 16 is an illustration of using the invention to orient an optical fiber.

The following examples are included to more clearly demonstrate the overall nature of the invention. These examples are exemplary, not restrictive, of the invention. FIG. 16 illustrates using the invention to orient an optical fiber about a remote center of rotation. In FIG. 16, two optical fibers 200 and 212 are shown. Optical fiber 212 is fixed in space. A plane 216 parallel to the surface of the tip 214 of optical fiber 212 is defined by the surface. Optical fiber 200 is an object that is coupled to a fiber holder 206 such as, for example, connector 134 shown in FIG. 5. A plane 202 parallel to the surface of the tip 204 of optical fiber 200 is defined by the surface. The center of the surface of tip 204 is at the remote center of rotation 210.

Plane 202 has a vertical axis 207 and a horizontal axis 208. Each axis passes through center of rotation 210. It will be understood that axes 207 and 208 need not be oriented so that one is always vertical and one is always horizontal. Instead, each of the axes 207 and 208 may be oriented in space as required by the task at hand. The only constraint is that each of the axes pass through the remote center of rotation 210. In an exemplary embodiment, axis 207 may be orthogonal to axis 208. It will be understood, however, that in an alternative embodiment, axes 207 and 208 need not be orthogonal to each other.

The optical fiber that can move, optical fiber 200, is inserted into the fiber holder 206. In an exemplary embodiment, fiber holder 206 is the equivalent of connector 134 in FIG. 5. The optical fiber 200 may be inserted, for example, into hole 135 in connector 134. The optical fiber 200 is placed in fiber mount 206 such that the tip 204 may be at the remote center of rotation 210. Such placement of optical fiber 200 means that fiber tip 204 will only experience pure rotational motion about remote center of rotation 210 as one, or both, of actuators 136, 138 are used. The invention may be used to place the fiber tip 204 at the center of rotation 210.

Optical fibers 200 and 212 are not in contact. Device 100 may be used to perform an angular alignment of the two fibers by aligning movable plane 202 with fixed plane 212. The alignment may be performed by rotating movable optical fiber 200 about the two axes 207 and 208 that pass through center of rotation 210. Specifically, optical fiber 200 may be rotated θ degrees about axis 207 and φ degrees about axis 208 using actuators 136 and 138. It can be determined that the optical fibers 200 and 212 are well aligned by monitoring the level of an optical signal transmitted from one fiber to the other fiber. The level of the signal will be at a maximum when the two optical fibers 200 and 212 are properly aligned.

Figure 17:
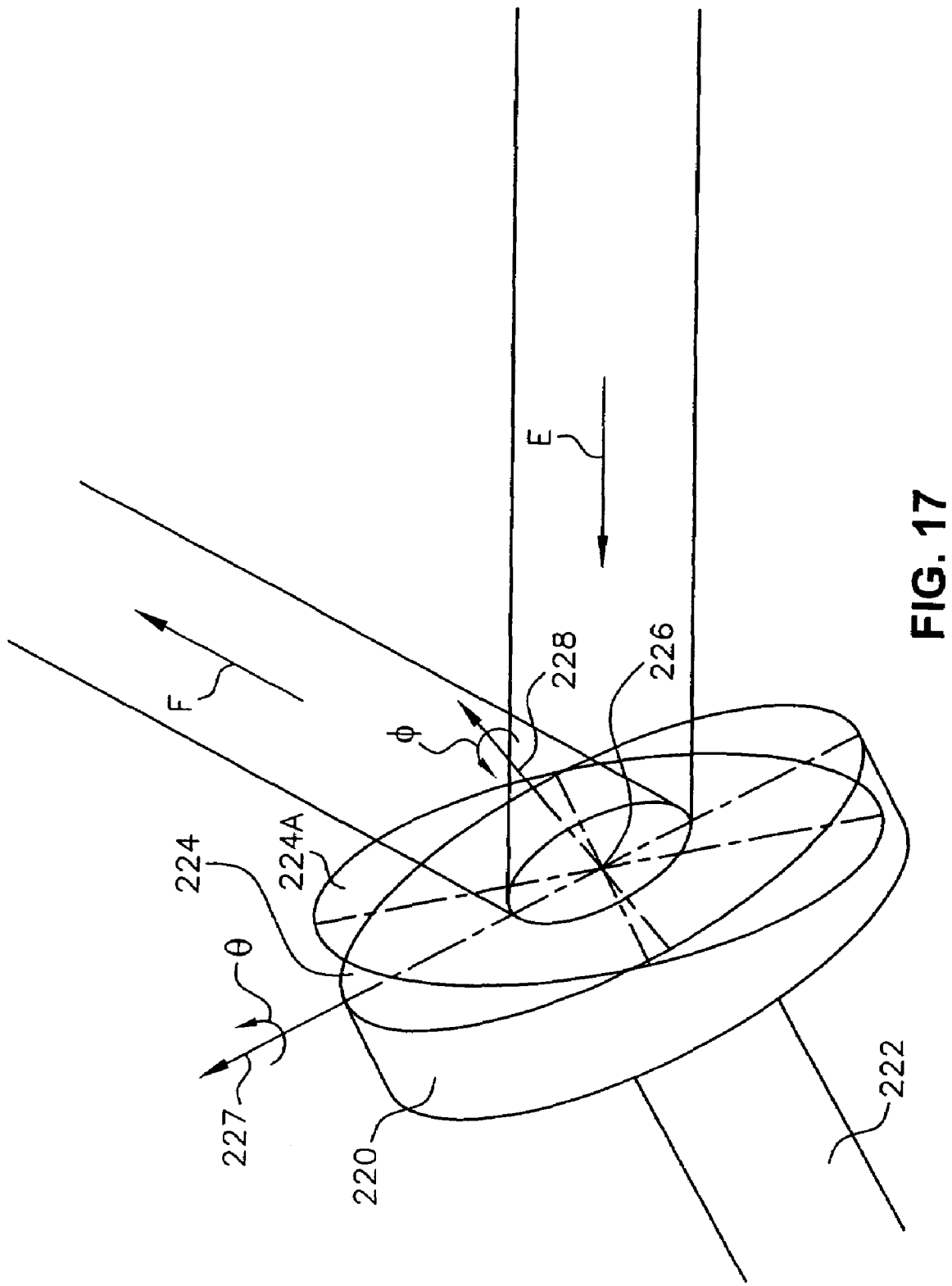
FIG. 17 is an illustration of using the invention to orient a mirror.

FIG. 17 illustrates using the invention to position a mirror to receive a laser beam at a remote center of rotation. In FIG. 17, a mirror 220 having a given thickness is shown. Mirror 220 is mounted onto a mount 222 which is the equivalent of connector 134 in FIG. 5. Via mount 222, mirror 220 is coupled to the output of the device 100. Mirror 220 is thus an object that is coupled to mount 222. The surface of mirror 220 defines a plane 224. The center of the surface and, therefore, the center of plane 224, is at a remote center of rotation 226.

Plane 224 has a vertical axis 227 and a horizontal axis 228. Each axis 227 and 228 passes through center of rotation 226. It will be understood that axes 227 and 228 need not be oriented so that one is always vertical and one is always horizontal. Instead, each of the axes 227 and 228 may be oriented in space as required by the task at hand. The only constraint is that each of the axes 227 and 228 pass through the remote center of rotation 226. In an exemplary embodiment, axis 227 may be orthogonal to axis 228. It will be understood, however, that in an alternative embodiment, axes 227 and 228 need not be orthogonal to each other.

Mirror 220 is placed on mirror mount 222 such that its surface 224 is mounted at the center of rotation 226. Such placement of mirror 220 assures that mirror surface 224 will experience pure rotational motion about remote center of rotation 226 as one, or both, of actuators 136, 138 are used. The invention may be used to place surface 224 at the center of rotation 226. The object of this illustration is to reflect an incoming laser beam identified by arrow E in the direction of arrow F. Using actuators 136 and 138, surface 224 may be oriented to properly receive and reflect laser beam E. The alignment may be performed by rotating mirror 220 about the two axes 227 and 228 that pass through center of rotation 226. Specifically, mirror 220 may be rotated θ degrees about axis 227 and φ degrees about axis 228 using actuators 136 and 138. After surface 224 has been rotated, it may be in position 224A.

In the illustrations described above, the remote center of rotation was located on the surface of the object being oriented with respect to the remote center of rotation. In an alternative embodiment, the remote center of rotation need not be located on the surface of the object being oriented. Alternatively, the remote center of rotation may be located inside the object or outside the object. Also in the illustrations described above, the object being oriented was coupled to movable base plate 102 by a device that is equivalent to connector 134. In FIG. 16, the object was coupled using fiber mount 206. In FIG. 17, the object was coupled using mirror mount 222. In an alternative embodiment, the object may be attached directly to movable base plate 102.

In a second embodiment of the invention, a slit segment is placed into the slot formed by segment 102F of movable base plate 102. The slit segment allows additional displacement of opening 144 and connector 134 of a small distance (e.g., a few microns). This additional displacement may be used to calibrate the object relative to the remote center of rotation. That is, it may be used to move the longitudinal axis of the connector to the remote center of rotation.

Figure 20:
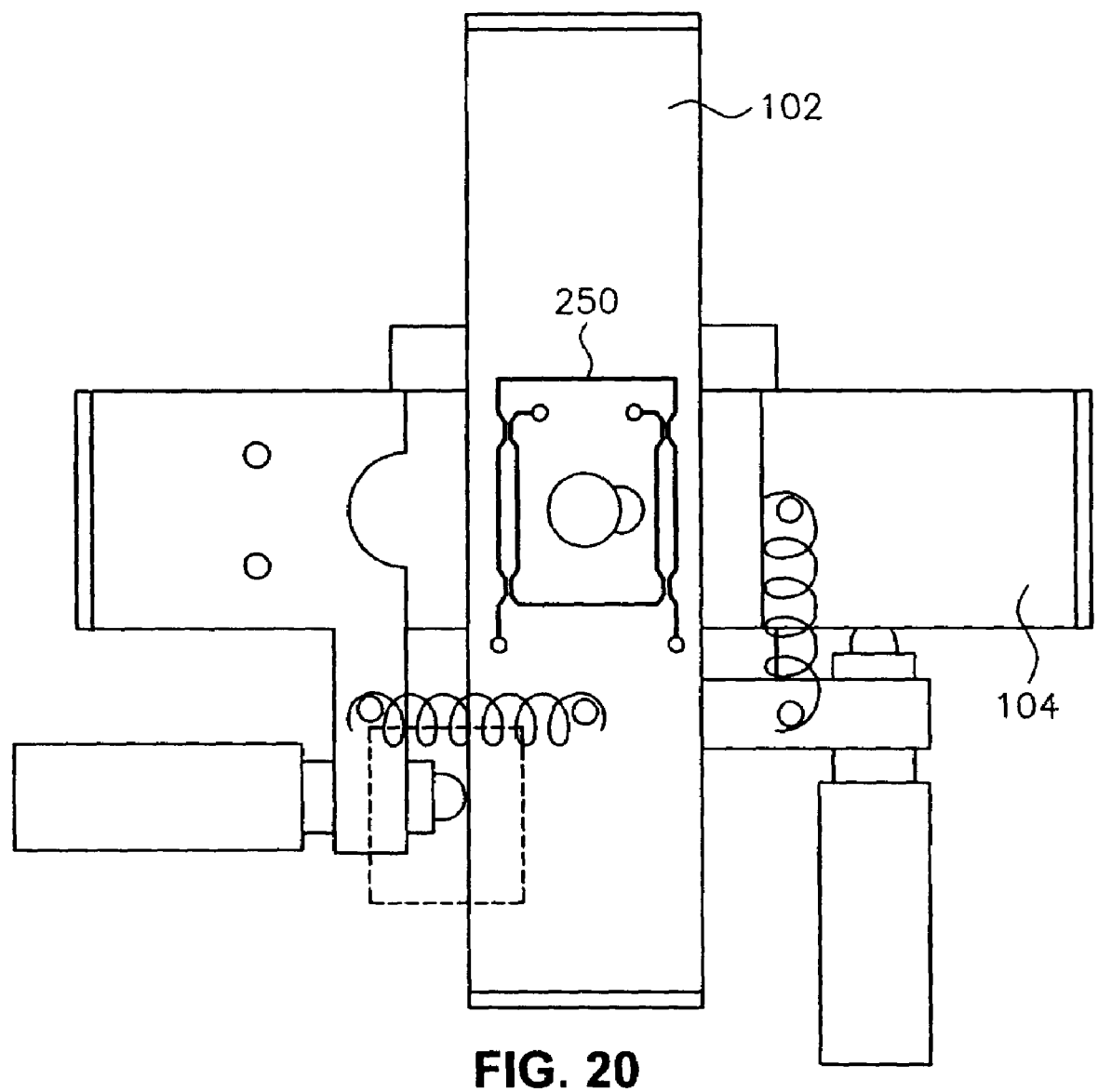
FIG. 20 is a bottom view of the second embodiment of the movable base plate of the invention.

FIGS. 18-20 illustrate the second embodiment of the invention. FIG. 18 is a top perspective view of a second embodiment of movable base plate 102. It is a calibration feature. As described above, movable base plate 102 has an opening 144 in central segment 102F. Opening 144 is adapted to receive and hold connector 134. A slit segment 250 is formed in segment 102F.

Slit segment 250 is seen more clearly in the expanded view shown in FIG. 19. Slit segment 250 comprises a first circuitous slit 252 and a second circuitous slit 254. Each of the circuitous slits 252, 254 are adjacent to opening 144 and form separate cantilevers in segment 102F about opening 144. In combination, the two circuitous slits 252, 254 surround opening 144. As shown in FIG. 20, each of the circuitous slits 252, 254 penetrates movable base plate 102 from its top surface all the way through to its bottom surface. The circuitous slits 252, 254 divide segment 102F into a plurality of portions. Opening 144 is located in one of the portions. The circuitous slits 252, 254 and the portions form an additional flexure that is embedded in movable base plate 102.

An opening 256 is located in front surface 102I of segment 102F. Opening 256 penetrates segment 102F until it meets circuitous slit 254 as shown in FIG. 19. A screw may be inserted into and through opening 256 until the screw contacts the region of circuitous slit 254 shown in FIG. 19. Further insertion of the screw into opening 256 will cause small movements of each of the plurality of portions causing the portion having opening 144 to move. As that portion moves, opening 144 will also move, thereby causing connector 134 to move. Thus, the circuitous slits 252, 254 are substantial enough to allow movement of the segment 102F. The combination of the circuitous slits 252, 254 and the portions of the segment 102F thus permit a calibration adjustment of the longitudinal axis of the connector 134 to make it more closely pass through the remote center of rotation. But each of the circuitous slits 252, 254 do not form a complete circuit that could result in removal of a portion from the segment 102F.

In an alternative embodiment, the slits can be replaced by an extra part that is rigidly attached to movable base plate 102 and provides a motion in one or two directions, as needed. The alternative extra part may calibrate the connector 134 by adjusting the longitudinal axis of connector 134 so that it passes through the remote center of rotation.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

What is claimed:

1. A system for positioning an object by rotating the object about a remote center of rotation outside a volume occupied by the system, the system comprising:
   a non-movable part providing a stationary reference structure;
   a movable part movable relative to the non-movable part;
   a connector coupled between the movable part and the object for positioning the object adjacent the remote center of rotation and for rotating the object about the remote center of rotation responsive to movement of the movable part, a movement of the connector being responsive to a movement of the movable part;
   a first force transmitting means coupled to the movable part for moving the movable part and the connector in a first direction, the first force transmitting means including at least a first flexure coupled to the movable part, the first flexure exhibiting a first stiffness in the first direction and a second stiffness in the second direction, the second stiffness being greater than the first stiffness, wherein movement of the connector in the first direction rotates the object about a first axis passing through the remote center of rotation; and
   a second force transmitting means coupled to the movable part for moving the movable part and the connector in a second direction, wherein movement of the connector in the second direction rotates the object about a second axis passing through the remote center of rotation.

2. The system of claim 1, wherein the movement of the movable part in the first direction is orthogonal to the movement of the movable part in the second direction.

3. The system of claim 1, wherein the second force transmitting means includes at least a second flexure coupled to the non-movable part, the second flexure exhibiting a first stiffness in the first direction and a second stiffness in the second direction, the second stiffness being greater than the first stiffness.

4. The system of claim 1, wherein the movable part is positioned in a plane that is movable in the first direction and the first force transmitting means moves the plane in the first direction.

5. The system of claim 4, wherein the plane is movable in the second direction and the second force transmitting means moves the plane in the second direction.

6. The system of claim 1, wherein the connector has a length selected to position a section of the object at the remote center of rotation.

7. The system of claim 1, wherein the volume occupied by the system includes a plurality of flexures and the connector extends beyond the volume formed by the plurality of flexures.

8. A system for positioning an object by rotating the object about a remote center of rotation outside a volume occupied by the system, the system comprising:
   a non-movable part providing a stationary reference structure;
   a movable part movable relative to the non-movable part;
   a connector coupled between the movable part and the object for positioning the object adjacent the remote center of rotation and for rotating the object about the remote center of rotation responsive to movement of the movable part, a movement of the connector being responsive to a movement of the movable part;
   a first force transmitting means coupled to the movable part for moving the movable part and the connector in a first direction, wherein movement of the connector in the first direction rotates the object about a first axis passing through the remote center of rotation; and a second force transmitting means coupled to the movable part for moving the movable part and the connector in a second direction, wherein movement of the connector in the second direction rotates the object about a second axis passing through the remote center of rotation, wherein the movable part has an opening for receiving the connector, the opening and the connector being movable responsive to the movement of the movable part, and a slit dividing the movable part into a plurality of portions with the opening being located within one of the portions, the system further comprising a third force transmitting means for moving the portion having the opening.

9. A system for positioning an object by rotating the object about a remote center of rotation outside a volume occupied by the system, the system comprising:

a non-movable part providing a stationary reference structure;

a movable part movable relative to the non-movable part;

a connector coupled between the movable part and the object for positioning the object adjacent the remote center of rotation and for rotating the object about the remote center of rotation responsive to movement of the movable part, a movement of the connector being responsive to a movement of the movable part;

a first force transmitting means coupled to the movable part for moving the movable part and the connector in a first direction, wherein movement of the connector in the first direction rotates the object about a first axis passing through the remote center of rotation; and a second force transmitting means coupled to the movable part for moving the movable part and the connector in a second direction, wherein movement of the connector in the second direction rotates the object about a second axis passing through the remote center of rotation, wherein the first and second force transmitting means include a plurality of flexures, each of the flexures having a longitudinal axis that passes through the remote center of rotation.

10. The system of claim 9, wherein the connector is disposed between the plurality of flexures.

11. The system of claim 9, wherein the plurality of flexures are made from a Cu—Be material.

12. The system of claim 9, wherein the plurality of flexures are made from a spring-steel material.

13. The system of claim 9, wherein the plurality of flexures are made from a material exhibiting a super-elastic effect.

14. The system of claim 9, wherein the plurality of flexures are made from a shape memory alloy.

15. The system of claim 9, wherein the plurality of flexures are made from a material selected from the group consisting of Ni—Ti; Ni—Ti—X where X is Cu, Hf, Zr, Pd, Co, or Fe; Cu—Zn—Al; and Cu—Al—Be.

16. The system of claim 9, wherein the plurality of flexures are made from a metallic material.

17. The system of claim 9, wherein the plurality of flexures are made from a plastic material.

* * * * *